No. 887,283. PATENTED MAY 12, 1908.
J. STEVENS.
AUTOMATIC VEHICLE BRAKE.
APPLICATION FILED NOV. 19, 1907.
2 SHEETS—SHEET 1.
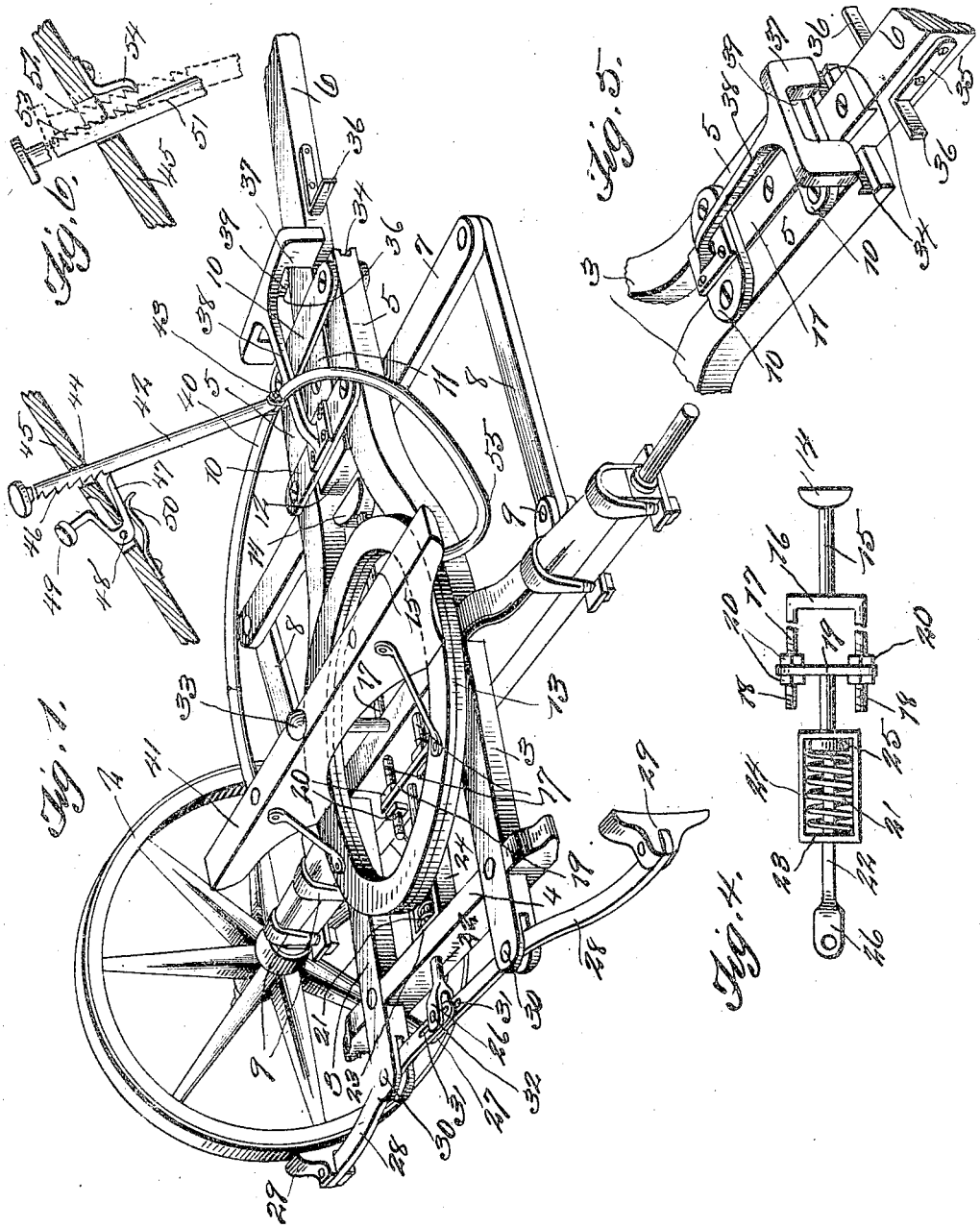
Witnesses
R. P. Bond.
Inventor
James Stevens,
By Colman & Co.
Attorneys

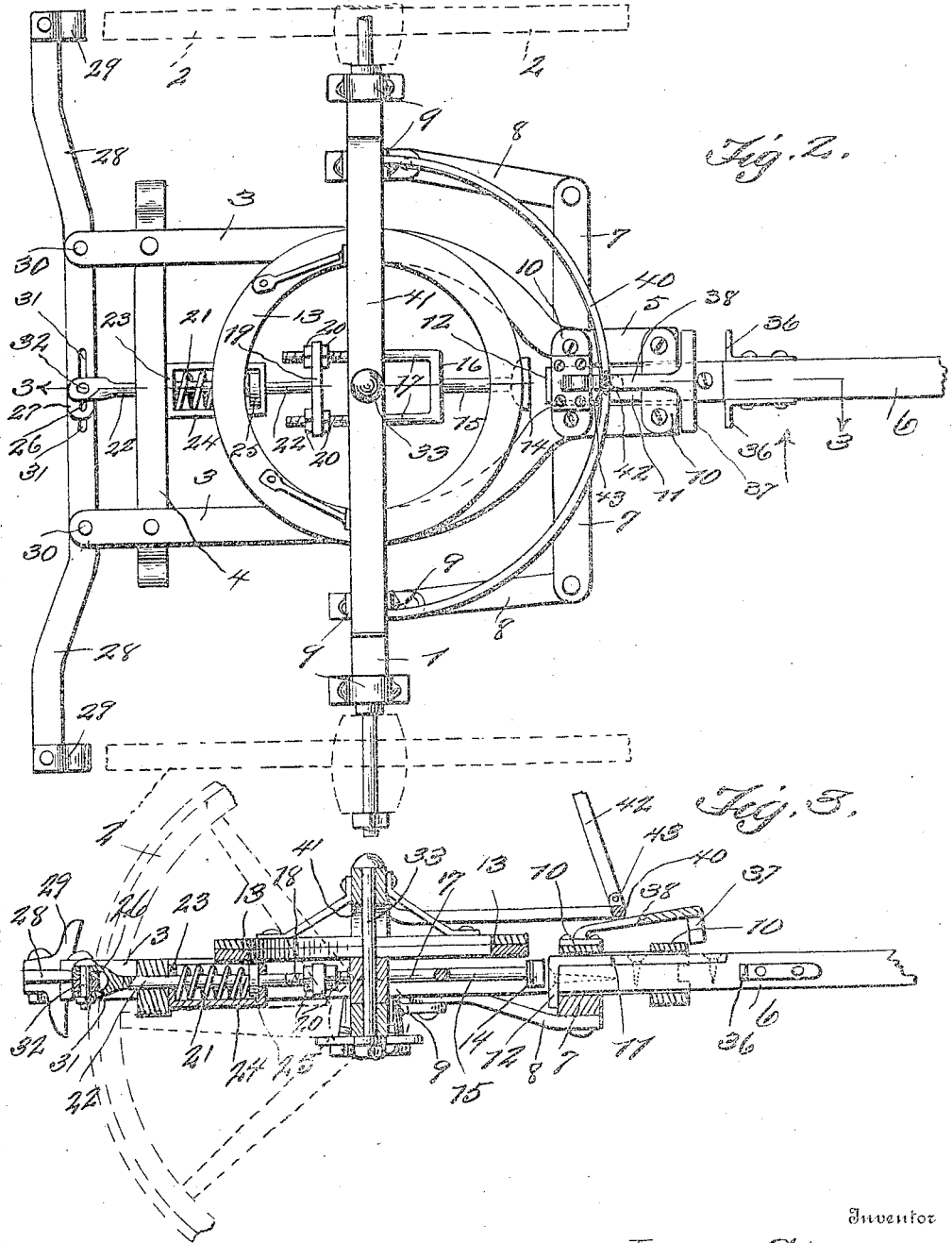

UNITED STATES PATENT OFFICE.

JAMES STEVENS, OF WASHINGTON, DISTRICT OF COLUMBIA.

AUTOMATIC VEHICLE-BRAKE.

No. 887,288.    Specification of Letters Patent.    Patented May 12, 1908.

Application filed November 19, 1907. Serial No. 462,829.

*To all whom it may concern:*

Be it known that I, JAMES STEVENS, a citizen of the United States, residing at Washington, in the District of Columbia, have invented a new and useful Automatic Vehicle-Brake, of which the following is a specification.

This invention relates to certain new and useful improvements in vehicle brakes and it has for its objects among others to provide a simple yet durable, efficient and reliable automatic vehicle brake, adapted to be automatically thrown into action at the proper time, yet having provision to prevent the application of the brake when desired, as when backing, also means for locking the brake in its braking position.

Other objects and advantages of the invention will hereinafter appear and the novel features thereof will be particularly pointed out in the appended claims.

The invention, in its preferred form, is clearly illustrated in the accompanying drawings, which, with the numerals of reference marked thereon, form a part of this specification and in which Figure 1 is a perspective view showing the running gear, with one wheel removed, and my improvement applied. Fig. 2 is a top plan. Fig. 3 is a longitudinal section on the line 3—3 of Fig. 2 looking in the direction of the arrow. Fig. 4 is a detail, in top plan, of the plunger mechanism. Fig. 5 is a perspective detail of the means for locking the parts either in braking position or to prevent the application of the brake. Fig. 6 is a detail partly in section and partly in elevation showing a modified form of the means for actuating the brake-controlling device.

Like numerals of reference indicate corresponding parts throughout the several views.

Referring to the drawings 1 represents the front axle provided with wheels 2 of ordinary construction.

3, 3 are the hounds, the rear ends of which are rigidly connected by the cross bar 4 and the forward end portions 5 are arranged parallel with each other and somewhat close together so as to form a guide for the pole or tongue 6, as seen best in Figs. 1 and 5.

7 is a cross bar rigidly secured to the under side of the hounds near the rear ends of the said portions 5, 5, and the opposite ends of this cross bar are rigidly secured to the arms 8 which in turn are secured to the axle by suitable means as the clips 9, as seen clearly in Fig. 1. To the upper sides of these parallel portions 5 are secured the metal members 10, and upon the upper face of the tongue 6 beneath these members 10 is a metallic plate 11 having a depending portion 12 which is adapted to engage the rear face of the cross bar 7, as seen best in Fig. 3, to limit the forward movement of the tongue or pole 6 and prevent its entire withdrawal.

Slidably mounted to the rear of the pole and beneath the fifth wheel 13 is disposed the mechanism which automatically applies the brakes when the horses back or when the weight of the wagon is forced upon them, as in going down hill. This mechanism comprises a plunger 14 carried by the plunger stem 15 which is rigidly attached to the cross bar 16 connecting the parallel legs or members 17. These legs or members are screw-threaded, as seen at 18, and are adjustably engaged with the cross bar 19, suitable nuts 20 being provided whereby adjustment is attained so that the tension of the spring 21 may be regulated and adjusted as occasion may require. This spring surrounds the rod 22 which is connected at one end with the cross bar 19, its other end being adapted to slide through the cross bar 4 and through the cross bar 23 of a frame 24, the said spring being confined between the cross bar 23 and a head or the like 25 which is movable with the rod 22, as will be clearly understood from Fig. 4. The rear end of the rod 22 is bifurcated, as seen at 26 in Fig. 1, and in this bifurcation is received the overlapped ends 27 of the brake arms 28 to the outer ends of which are attached the brake shoes 29 adapted to operate upon the rear faces of the front wheels 2. The brake arms 28 are pivoted at 30 to any suitable fixed part, in this instance shown as the rear ends of the members 3, 3, but they may be supported from a spring or any other convenient part of the vehicle. The overlapped ends of the brake arms 28 are provided with elongated slots 31 in which the connecting bolt 32 is engaged, as seen best in Figs. 1 and 2.

The form of the parts seen in Fig. 4 is but one of many that may be employed for this purpose. This particular form is shown in order to straddle and not interfere with the king bolt 33, as will be readily understood.

The operation of my invention so far as hereinbefore described is as follows. With the parts in the position in which they are seen in the different views, the throwing of the weight of the load upon the horses either by backing or in going down hill, causes the tongue to slide rearward, or the running gear relatively forward, and the pressure of the rear end of the tongue upon the plunger 14 forces the same rearward and compresses the spring 21, the rod 22 being simultaneously forced rearward the brake arms 28 moved on their pivot, the inner portions being forced rearward and the outer ends forced forward, thus automatically applying the brakes to the rear of the front wheels. As soon as normal conditions are assumed, the spring 21 forces the plunger forward and releases the brakes.

In order to lock the pole in its rearward position, I form the forward ends of the members 5 with the transverse grooves or recesses 34 and to the opposite sides of the pole 6 at proper distance from its rear end I secure the right angled plates 35, the lateral portions 36 of which are adapted to engage in the said grooves or recesses 34 when the pole is in its rearmost position, and then I force downward the locking member 37 which is carried by the resilient arm or member 38 secured in any suitable manner to some fixed part, as for instance to the rear cross member 10. This locking member 37 is recessed at 39 to receive the pole 6; and when it is desired to lock the parts with the pole in its rearmost position, this locking member is forced down and closes over the lateral members 36 of the angular plates 35 of the pole.

If it be desired to lock the parts so that the backing of the horses will not apply the brakes, this locking member is forced downward when the parts are in the position seen in Figs. 1 and 5 and also in Figs. 2 and 3 so as to be interposed between the forward ends of the members 5 and the lateral portions 36. When in this position, the locking member 37 prevents the rearward movement of the pole to an extent sufficient to apply the brakes with any practical force.

The locking member 37 and its spring support 38 may be controlled in any suitable manner. In the present instance I have shown a spring member 40 which is secured at its ends to some suitable part, as for instance to the bolster 41, its forward portion extending over the spring arm 38 and adapted, when forced down upon said arm, to force it and the locking member 37 downward.

42 is a rod connected at one end, as at 43, with the spring member 40, its other end sliding through an opening 44 in the footboard 45. This rod is toothed, as at 46, said teeth being adapted to be engaged by a pawl 47 pivotally mounted at 48 and having an operating member 49, movement of which is opposed by the spring 50, as seen clearly in Fig. 1. When it is desired to force downward the locking member 37, the rod 42 is pressed downward by the foot or otherwise, and the pawl 47 engaging in the teeth 46 automatically locks the parts in their depressed position.

In Fig. 6 is shown a slightly modified form, in which the operating rod 51 is mounted for movement in an elongated slot 52 in the footboard 45, the forward face of said rod being toothed, as at 53, to be engaged by a pawl 54 when the rod 51 is moved forward, as indicated by dotted lines in Fig. 6. When the rod is disengaged from the pawl, the resiliency of the member 40, aided by that of the support 38, allows the parts to return to their normal position. The spring member 40 is made cam shaped, as seen at 55, by means of which, as the wagon is turned to bring the pole to one side or the other to an abnormal degree, the under cam face or surface of said member will ride upon the support 38 and thus automatically force downward the locking member 37, as will be readily understood.

While I have shown and hereinbefore described what, at the present time, I consider the preferable form of embodiment of my invention, it will be evident that the same is subject to changes, variations and modifications and I therefore do not intend to restrict myself to the details of construction, form and proportion of parts as hereinbefore described, but reserve the right to make such changes, variations and modifications as come properly within the scope of the protection prayed.

What is claimed as new is:—

1. In an automatic vehicle brake, a slidable tongue, a slidable mechanism automatically actuated thereby to apply the brakes, a spring constructed to be put under compression by such slidable mechanism to automatically release the brakes and force the tongue forward, a locking member engageable over the tongue to serve the double function of locking the tongue in its rearward position and also to limit rearward movement of said tongue and lateral means on the tongue upon either side of which said locking member is engageable.

2. In an automatic vehicle brake, a slidable tongue, a slidable mechanism automatically actuated thereby to apply the brakes, a spring constructed to be put under compression by such slidable mechanism to automatically release the brakes and force the tongue forward, a locking member engageable over the tongue to serve the double function of locking the tongue in its rearward position and also to limit rearward movement of said tongue, lateral means on the tongue engageable upon either side of said locking member and a yielding support for said locking member.

3. In an automatic vehicle brake, a slidable tongue, a slidable mechanism automatically actuated thereby to apply the brakes, a spring constructed to be put under compression by such slidable mechanism to automatically release the brakes and force the tongue forward, a locking member engageable over the tongue to serve the double function of locking the tongue in its rearward position and also to limit rearward movement of said tongue, a member with a cam surface disposed over said locking member and means on the tongue engageable upon either side of said locking member.

4. In an automatic vehicle brake, a slidable tongue, a slidable mechanism automatically actuated thereby to apply the brakes, a spring constructed to be put under compression by such slidable mechanism to automatically release the brakes and force the tongue forward, a locking member engageable over the tongue to serve the double function of locking the tongue in its rearward position and also to limit rearward movement of said tongue, a yielding support for said locking member, and lateral means on the tongue engageable upon either side of said locking member.

5. In an automatic vehicle break, a slidable tongue, a slidable mechanism automatically actuated thereby to apply the brakes, a spring constructed to be put under compression by such slidable mechanism to automatically release the brakes and force the tongue forward, a locking member engageable over the tongue to serve the double function of locking the tongue in its rearward position and also to limit rearward movement of said tongue, means on the tongue engageable upon either side of said locking member, and a depressible yielding member for contact with said support.

6. In an automatic vehicle brake, a slidable tongue, a slidable mechanism automatically actuated thereby to apply the brakes, a spring constructed to be put under compression by such slidable mechanism to automatically release the brakes and force the tongue forward, a locking member engageable over the tongue to serve the double function of locking the tongue in its rearward position and also to limit rearward movement of said tongue, a yielding support for said locking member, means on the tongue engageable upon either side of said locking member, and a depressible yielding member above said support and provided with a cam surface for contact therewith.

7. In an automatic vehicle brake, a slidable tongue, brake-applying means actuated thereby, a locking member, a yielding support therefor, and a depressible yielding member for contact with said support, said yielding member having a cam under surface.

8. In an automatic vehicle brake, a slidable tongue, guides therefor having recesses disposed horizontally in their forward ends, means on said tongue for engagement with said recesses, and a locking member adapted to straddle the tongue and to engage over said means and in front of the same and the recesses when the latter are engaged in said recesses.

9. In an automatic vehicle brake, a slidable tongue, guides therefor having recesses disposed horizontally in their forward ends, means on said tongue for engagement with said recesses, a locking member adapted to straddle the tongue and to engage over said means and in front of the same and the recesses when the latter are engaged in said recesses, and a yielding support for said locking member.

10. In an automatic vehicle brake, a slidable tongue, guides therefor having recesses disposed horizontally in their forward ends, means on said tongue for engagement with said recesses, and a locking member adapted to engage over and in front of said means when the latter are engaged in said recesses, said locking member being recessed to receive the tongue.

11. In an automatic vehicle brake, a slidable tongue, guides therefor having recesses disposed horizontally in their forward ends, means on said tongue for engagement with said recesses, a locking member adapted to engage over and in front of said means when the latter are engaged in said recesses, and a yielding support for said locking member, said locking member being recessed to receive the tongue.

12. In an automatic vehicle brake, a slidable tongue, guides therefor having recesses, means on said tongue for engagement with said recesses, a locking member adapted to engage over said means when the latter are engaged in said recesses, a yielding support for said locking member, said locking member being recessed to receive the tongue, and a depressible spring member engaging said support.

13. In an automatic vehicle brake, a slidable tongue, guides therefor having recesses, means on said tongue for engagement with said recesses, a locking member adapted to engage over said means when the latter are engaged in said recesses, a yielding support for said locking member, said locking member being recessed to receive the tongue, and a depressible spring member engaging said support, said spring member having a cam portion.

JAMES STEVENS.

Witnesses:
FRANK A. HARRISON,
E. H. BOND.